United States Patent [19]

Killat et al.

[11] 4,416,729

[45] Nov. 22, 1983

[54] AMMONIUM POLYAMIDOAMINES

[75] Inventors: George R. Killat; Larry R. Wilson, both of Midland, Mich.

[73] Assignee: The Dow Chemical Company, Midland, Mich.

[21] Appl. No.: 336,538

[22] Filed: Jan. 4, 1982

[51] Int. Cl.³ .............................................. D21H 3/48
[52] U.S. Cl. ............................. 162/164.3; 167/168.2; 167/168.4; 167/168.5; 167/168.6
[58] Field of Search ............... 162/168.2, 168.4, 168.5, 162/168.6, 164.3; 525/539; 528/363

[56]    References Cited
U.S. PATENT DOCUMENTS

| | | | |
|---|---|---|---|
| 3,240,761 | 3/1966 | Keim et al. | 260/78 |
| 3,305,493 | 2/1967 | Emmons | 528/363 |
| 3,445,441 | 5/1969 | Rushton | 528/363 |
| 3,607,622 | 9/1971 | Espy | 162/167 |
| 3,951,921 | 4/1976 | Espy et al. | 260/78 SC |
| 4,156,775 | 5/1979 | Evani et al. | 528/421 |
| 4,198,269 | 4/1980 | Evani et al. | 162/164 EP |
| 4,298,639 | 11/1981 | Van Eenam | 162/164.3 |

FOREIGN PATENT DOCUMENTS 49-29124  8/1974  Japan ................................ 162/168.6

Primary Examiner—William F. Smith

[57]    ABSTRACT

Wet strength of paper is effectively increased by contacting paper pulp with an ammonium polyamidoamine having cross-linking functionality such as epoxy or azetidinium and subjecting a wet sheet of such pulp to conditions sufficient to cure the polyamidoamine.

6 Claims, No Drawings

AMMONIUM POLYAMIDOAMINES

BACKGROUND OF THE INVENTION

This invention relates to ammonium polyamidoamines and to their use in the manufacture of paper.

As disclosed in U.S. Pat. No. 3,445,441, polyamidoamines are useful as demulsifiers, corrosion inhibitors, and flocculants for the clarification of water. These polyamidoamines are normally produced by reacting nearly stoichiometric amounts of an alkyl acrylate with a polyamine such as polyalkylene polyamine. Unfortunately, such polymers, which are not curable, often do not have sufficient molecular weight to be useful in many applications requiring viscosity enhancement and/or high flocculant capability.

U.S. Pat. No. 3,305,493 discloses the use of thermosetting adducts of the polyamidoamines and epichlorohydrin in the sizing of paper. Although such thermosetting adducts, after increase in molecular weight through cross-linking, have sufficient molecular weight to be useful in many applications, it is difficult to control the cross-linking reaction so that the formation of unwanted gels is prevented. On the other hand, if the cross-linking reaction is stopped prematurely, the resulting product does not exhibit the desired activity.

In view of the foregoing deficiencies of the conventional polyamidoamines, it is highly desirable to provide a polymer that has reproducible characteristics and has sufficient activity to be useful in applications such as wet strength additives in the manufacture of paper and the like.

SUMMARY OF THE INVENTION

In one aspect, the present invention is an ammonium polyamidoamine having the aforementioned desirable properties. The ammonium polyamidoamines of this invention are unique in that they bear pendant ammonium moieties having cross-linking functionality. Surprisingly, while such ammonium polyamidoamines are very effective as wet strength additives in the manufacture of paper, the paper which has been treated with such ammonium polyamidoamines is sufficiently breakable that it can be recycled.

In another aspect, this invention is a method for preparing preferred ammonium polyamidoamines which method comprises (1) contacting a linear polyamidoamine with an $\alpha,\beta$-ethylenically unsaturated carboxylic compound under conditions sufficient to form a substituted polyamidoamine, (2) contacting the substituted polyamidoamine with a polyamine having at least 2 secondary and/or primary amine moieties under conditions sufficient to form a branched polyamidoamine bearing a pendant amine moiety and (3) contacting the branched polyamidoamine with an epihalohydrin under conditions sufficient to form pendant curable ammonium moieties on the branched polyamidoamine.

In yet another aspect, this invention is a method for improving the wet strength of the paper which comprises contacting the paper pulp with an amount of the ammonium polyamidoamine which is effective to increase the wet strength of the paper sheet formed from said pulp when said sheet is subjected to conditions sufficient to cross-link the polyamidoamine.

In addition to their utility in the manufacture of paper, the ammonium polyamidoamines of this invention are also useful as flocculants, dimension stabilizers for textiles such as wool, tie coat adhesives and the like.

DETAILED DESCRIPTION OF THE ILLUSTRATIVE EMBODIMENTS

The ammonium polyamidoamines of this invention are advantageously characterized as having a polyamidoamine backbone bearing at least one pendant cross-linking ammonium moiety. Such ammonium moiety, hereinafter also referred to as $Z^{\oplus}$, is represented by the formula:

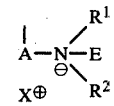

wherein each $R^1$ and each $R^2$ are independently hydrogen, halohydroxyhydrocarbyl, hydrocarbyl, hydroxyhydrocarbyl or aminohydrocarbyl, wherein amino is a secondary or tertiary amino; E is a monovalent hydrocarbon radical bearing an epoxy group or a group or groups capable of being converted to an epoxy group or E and $R^1$ are collectively a propylene radical or substituted propylene radical $$-\overset{\alpha}{\underset{|}{C}}-\overset{\beta}{\underset{|}{C}}-\overset{\alpha}{\underset{|}{C}}-$$

wherein the $\alpha$-carbon substituents, if any, are $C_1$-$C_3$ alkyl and the $\beta$-carbon substituent, if any, is hydroxy, halo, hydrocarbyl or hydroxyhydrocarbyl; A is a divalent organic radical, e.g., alkylene or amidoamino; X is a monovalent or polyvalent anion common to conventional ammonium salts. For the purposes of this invention, the term "hydrocarbyl" is defined as a monovalent hydrocarbon radical such as alkyl, cycloalkyl, aryl, alkenyl and the like. Preferred ammonium polyamidoamines have at least one quaternary ammonium repeating unit represented by the formula:

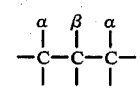

wherein A, E, X, $R^1$ and $R^2$ are as defined before except that neither $R^1$ nor $R^2$ is hydrogen; each $R^3$ is independently hydrogen or lower alkyl, e.g., methyl or ethyl, each m is a whole number from 2 to 6; and n is a whole number from 1 to 3, more preferably 1 or 2, most preferably 1.

In the more preferred quaternized polyamidoamines, A is an amidoamino radical represented by the formula:

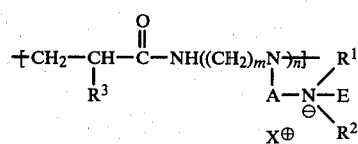

wherein $R^3$ and m are as defined hereinbefore and q is zero or a whole number from 1 to 2; each $R^1$ is independently alkyl, each E is independently oxiranyl or E and R¹ are collectively 2-hydroxypropylene. In the most preferred quaternized polyamidoamines, E and R¹ are collectively 2-hydroxypropylene such that the pendant quaternary ammonium moiety contains an azetidinium ring and is represented by the formula:

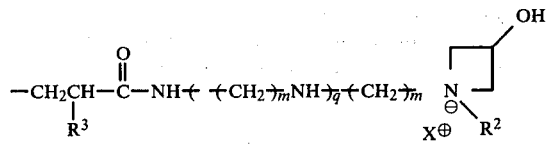

wherein R³ is hydrogen or methyl; m is 2; q is 0, 1, 2 or 3; X is chloride and R² is alkyl, especially methyl, halohydroxyalkyl, especially 3-chloro-2-hydroxy propyl, or epoxy, especially 2,3-epoxy propyl. Preferably, the ammonium polyamidoamines of this invention are random polymer represented by the statistical formula:

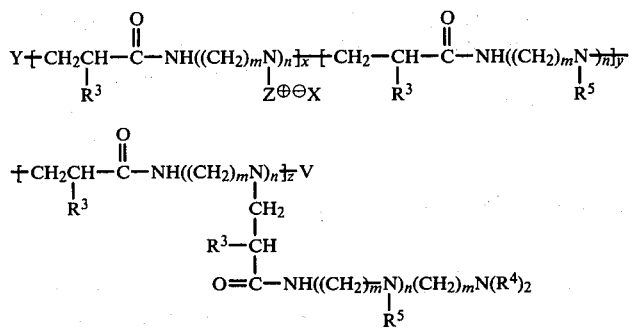

wherein R³, Z⊕, X⊖, m and n are as defined hereinbefore; Y is a terminal group characteristic of polyamidoamines; V is hydrogen or the residue of polymerization to form a polyamidoamine; each R⁴ is independently hydrogen or lower alkyl, e.g., C₁-C₃ alkyl; each R⁵ is independently hydrogen or

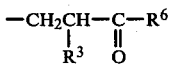

wherein R³ is as defined before and R⁶ is —NH₂; —OH or —OR⁷ wherein R⁷ is hydrocarbyl such as alkyl; x is a whole number from 1 to 1000; y is 0 or a whole number from 1 to 200; and z is 0 or a whole number from 1 to 200, provided that the ratio of x to (y+z) is at least 3:1, most preferably at least 10:1.

In the preparation of the ammonium polyamidoamines of this invention, it is preferred to successively react a linear polyamidoamine with an ethylenically unsaturated carboxylic acid, ester or amide and then with polyamine to form a branched polyamidoamine. The branched polyamidoamine is then contacted with epihalohydrin or other compound containing a moiety as defined by E hereinbefore to yield the desired ammonium polyamidoamine wherein the pendant ammonium moiety contains cross-linking functionality.

The linear polyamidoamines are conveniently prepared in the manner described in U.S. Pat. No. 3,305,493, the relevant portions of which are incorporated herein by reference. In general, the essentially linear polyamidoamine is prepared by contacting an alkylenediamine or a polyalkylene polyamine with the ethylenically unsaturated carboxylic compound, e.g., alkyl acrylate or methacrylate, acrylamide, acrylic acid or methacrylic acid, under reactive conditions. Preferably, the foregoing reactants are employed in stoichiometric ratio to form a linear polyamidoamine represented by the formula:

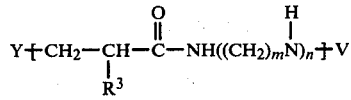

wherein R³, Y, V, m and n are as defined hereinbefore. Advantageously, the linear polyamidoamine has a weight average molecular weight (Mw) of at least about 500, preferably at least 1000, most preferably from about 3000 to about 10,000.

When converting the linear polyamidoamine to a branched polyamidoamine, the linear polyamidoamine is contacted with an ethylenically unsaturated carboxylic compound under conditions sufficient to produce a Michaels addition reaction between an amine moiety of the linear polyamidoamine and the ethylenically unsaturated moiety of the carboxylic compound. Exemplary carboxylic compounds include α,β-ethylenically unsaturated carboxylic acids such as acrylic acid and methacrylic acid; α,β-ethylenically unsaturated amides such as acrylamide and methacrylamide; and esters of α,β-ethylenically unsaturated acids derived from primary alcohols having from 1 to 10 carbons. Of the foregoing carboxylic compounds, methyl acrylate and acrylamide are preferred, with methyl acrylate being especially preferred. The reaction of the unsaturated carboxylic compound with the linear polyamidoamine should be performed at a temperature at which substantial cross-linking of the polymer is avoided. Generally, such temperature is in the range from about 0° to about 200° C., with temperatures of about 20° to 100° C. being preferred. While the foregoing reaction can be conducted neat, it is generally desirable to employ a diluent which is a solvent for the polyamidoamine but which is substantially inert to the reactants. Water and lower alkanol, having from 1 to 4 carbons, are generally preferred diluents with methanol being most preferred.

The ratio of equivalents of the aforementioned unsaturated carboxylic compound to the equivalents of amino hydrogens present in the linear polyamidoamine can be varied to produce the desired substitution of pendant carboxylic groups on the polyamidoamine. If complete substitution is desired, a stoichiometric amount or an excess of the unsaturated carboxylic compound can be employed. However, if a lesser degree of substitution is desired, the reactants can be combined in the desired ratio and essentially completely reacted. The progress of this reaction can be monitored by infrared spectrophotometric analysis or other techniques known in the art. It is advantageous that at least 50 mole percent of the total amino hydrogens of the linear polyamidoamine be reacted with the unsaturated carboxylic compound in order to provide the ultimate ammonium polyamidoamine with the unique properties and advantages characteristic of the polymers of this invention. Preferably, at least about 75 mole percent of amino hydrogens are reacted with polymers having from about 90 to about 100, mole percent of amino hydrogens reacted being most preferred.

In this form, the polyamidoamine bears pendant groups corresponding to the formula:

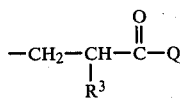

wherein $R^3$ is as defined hereinbefore and Q is OH, $NH_2$ or alkoxy having from 1 to 10 carbon atoms. It is understood that the moieties represented by Q may be the same or different in the same molecule of the polyamidoamine. For example, if a single unsaturated carboxylic compound is reacted with the linear polyamidoamine, all of the moieties represented by Q will be the same. However, if a mixture of unsaturated carboxylic compounds, e.g., acrylic acid and acrylamide is employed, then the moieties represented by Q will be different. In order to form the desired branched polyamidoamine, this polyamidoamine bearing pendant carboxylic groups is reacted with an alkylenediamine or polyalkylene polyamine, which optionally bears hydroxyl alkyl moieties. However, prior to the introduction of the alkylenediamine or polyalkylene polyamine, it is desirable to remove essentially all unreacted carboxylic compounds, usually by distillation. The amount of alkylenediamine or polyalkylene polyamine employed is that amount which is sufficient to suppress cross-linking of the polyamidoamine which can occur through the pendant carboxylic moieties. Beneficially, the alkylenediamine or polyalkylene polyamine is employed in a 200 to 300 mole percent excess, the pendant carboxylic moieties on the polyamidoamine. Exemplary alkylenediamines which can be reacted with the polyamidoamine having pendant carboxylic groups include ethylendiamine, propylenediamine and hexamethylenediamine. Illustrative polyalkylene polyamines include diethylenetriamine, triethylenetetramine, and tetraethylenepentamine. Also suitable are aminoethanolamine and N,N-dimethylethylenediamine. Of the foregoing amines, ethylenediamine and diethlenetriamine are preferred, with ethylenediamine being especially preferred.

The conditions which are desirable to promote the reaction of the polyamidoamine bearing the pendant carboyxlic moieties with the alkylenediamine or polyalkylene polyamine will vary depending upon the carboxyl moiety (Q) of the pendant moiety. If Q is alkoxy, the reaction is a simple amidation of the pendant ester groups on the polyamidoamine which proceeds under relatively mild conditions, e.g., temperatures in the range from about 20° to about 200° C. This amidation of ester can be performed neat, but is preferably carried out in an inert diluent in which the polyamidoamine and the alkylenediamine or polyalkylene polyamine are soluble. While water is generally the preferred diluent in such an amidation reaction, it is generally desirable to minimize hydrolysis of the ester groups which can occur at higher temperatures by employing an excess of the diamine or polyamine reactant. Methanol and other lower alkanols are also advantageously employed as diluents in this mild amidation reaction.

In instances wherein Q is hydroxyl or amino, it is necessary to employ more severe reaction conditions, e.g., temperatures in the range from about 125° to about 200° C., with temperatures from about 150° to about 190° C. being preferred. Generally, in these reactions, a diluent is not necessary.

The time required to effect substantially complete reaction by either of the foregoing procedures will vary depending upon the reaction temperature and other factors such as the degree of substitution desired. Following completion of the reaction, the branched polyamidoamine is conveniently recovered by a distillation of solvents and/or byproducts from the polymer at reduced pressure.

In the conversion of all or a portion of the pendant amine moieties of the branched polyamidoamine to ammonium form, the branched polyamidoamine is contacted with an alkylating agent, a mixture of alkylating agents or other agents capable of converting the amine to ammonium form such that the pendant amino nitrogens of the branched polyamidoamine are converted to ammonium moieties represented by the following formula:

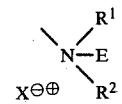

wherein each $R^1$, $R^2$, E and $X^\ominus$ are as defined hereinbefore.

In the preparation of the more preferred quaternized polyamidoamine, the branched polyamidoamine is reacted with an epoxy compound such as an epihalohydrin or an azetidinium forming compound such as a 1,3-dihaloalkane under conditions sufficient to cause the pendant amine groups of the branched polyamidoamine to be alkylated. It is preferred to carry out this alkylation reaction in a solvent. If a solvent system is used in the formation of the branched polyamidoamine, then the same solvent or water diluted solvent may be used in the alkylation reaction. Thus, water, lower alkanols such as methanol and mixtures thereof are preferred solvents for the alkylation reaction. In general, sufficient solvent is employed to just solubilize the reactants and to permit easy stirring. Generally, solutions containing from about 30 to about 75 weight percent of the branched polyamidoamine are employed. Following dissolution of the branched polyamidoamine, the epihalohydrin or other suitable alkylating agent is added. In the case of epihalohydrin, the reaction is preferably carried out at temperatures in the range from about 0° up to about 35° C. The resulting alkylated polyamidoamine, which is prepared using epihalohydrin, contains an epoxy group and/or halohydrin groups in the quaternary ammonium moiety. This material may be employed as is as a wet strength agent or may be converted to an azetidinium ring by dilution with water and heating. Pendant residual halohydrin groups may be converted to epoxy groups by contacting this material with a neutralizing agent for acid such as sodium hydroxide, calcium carbonate, sodium carbonate, sodium bicarbonate and the like under conditions described by Weissberger in "Heterocyclic Compounds with Three and Four Membered Rings," Interscience Publishers, Part 2, page 891 (1964). In instances wherein it is desirable to prepare a quaternary ammonium compound in which the amino nitrogen is substituted with an alkyl or hydroxyalkyl group in addition to an epoxy group or an azetidinium ring, the branched polyamidoamine may be first alkylated with an alkyl halide or hydroxyalkyl halide or alkylene oxide and then subsequently alkylated with epihalohydrin.

The resulting ammonium polyamidoamine is now ready for use as an additive in the manufacture of paper or in the manufacture of textiles.

In the manufacture of paper having improved wet and dry strength, the method of the present invention is practiced in the following manner: (1) an aqueous suspension of cellulosic fibers is formed, (2) the ammonium polyamidoamine, advantageously in the form of a dilute aqueous solution, is added to the suspension and thereby absorbed onto the cellulosic fibers, and (3) the fibers are sheeted and dried using conventional procedures to form the desired cellulosic web.

The aqueous suspension of cellulosic fibers is formed in any conventional manner. Usually the fibers are beaten and refined, and the suspension is adjusted to convenient consistency, advantageously from about 0.1 to about 6 weight percent fibers based on the weight of the suspension. Because of the strengthening characteristics of the ammonium polyamidoamine, the amount of beating which is conventionally required can be reduced significantly. In addition, cheaper grades of pulp can be employed in the practice of this invention. The amount of ammonium polyamidoamine added is that which is effective to improve the wet strength of the resulting web of the cellulosic fibers. Such amounts are preferably within the range from about 0.1 to about 2, especially from about 0.25 to about 0.75, weight percent based on the dry weight of the cellulosic fiber.

While the particular mode of adding the ammonium polyamidoamine to the suspension of cellulosic fibers is not particularly critical, it is desirable that the particular mode be sufficient to achieve uniform dispersal of the polyamidoamine throughout the suspension in order to ensure uniform absorption of the polymer by the fibers. The addition is therefore most effectively practiced by adding an aqueous solution containing from about 0.1 to about 10, preferably about 1, weight percent of the polyamidoamine to a turbulent stream of the fibrous suspension at the stock chest or at some other point near the web forming wire. It is suitable, however, to incorporate the polymer in the beater, hydropulper or stock chest. In the latter case, the stock is most advantageously agitated during the addition, and the solution of the polymer is in a rather dilute form. The pH of the cellulosic fibrous suspension may be at any value between about 4 and about 8, preferably from about 6 to about 8.

In addition to the ammonium polyamidoamine, conventional amounts of other additives normally employed in the manufacture of paper such as pigments, fillers, stabilizers, retention aids and the like may be employed. Also, it is found that the addition of various anionic polymers such as polyacrylic acid or partially hydrolyzed polyacrylamides further enhance the strengthening characteristics of the ammonium polyamidoamine. When such anionic polymers are advantageously employed, it is preferred to employ a partially hydrolyzed polyacrylamide having a weight average molecular weight (Mw) from about 200,000 to about 500,000 and from about 5 to about 30 mole percent of amide groups converted to acid groups. When used, such anionic polymers are employed in amounts in the range from about 0.1 to about 1, preferably from about 0.4 to about 0.7 milliequivalents of anionic moiety of the anionic polymer per milliequivalents of cationic moiety of the ammonium polyamidoamine.

Cellulosic fibers most advantageously treated with the ammonium polyamidoamines of the present invention include bleached and unbleached sulfate (Kraft) pulps, bleached and unbleached sulfite pulps, bleached and unbleached soda pulps, neutral sulfite pulps, semichemical and chemical ground wood pulps, ground wood pulps and any combination of such fibers. The foregoing descriptions refer to wood pulp fibers which have been prepared by means of a variety of processes which are known in the pulp and paper industries.

In addition to the foregoing applications, the ammonium polyamidoamines of the present invention are also usefully employed as antistatic agents and dimension stabilizers for textiles. Textiles beneficially treated with such ammonium polyamidoamines include synthetic fibers such as nylon, polyolefins, polyesters and the like as well as blends of such fibers with natural fibers such as cotton, wool and the like.

The following examples are given to illustrate embodiments of the invention and should not be construed as limiting its scope. In these examples, all parts and percentages are by weight unless otherwise indicated.

EXAMPLE 1

A. Preparation of Linear Polyamidoamine

Into a 250-ml three-neck round bottom flask equipped with a reflux condenser, air driven stirrer and addition funnel is charged 60.1 g (1 mole) of ethylenediamine. To the flask is then added with stirring 86.09 g (1 mole) of methyl acrylate by dripping it slowly into the flask over a period of 35 minutes. The temperature of the reaction mixture rises to 70° C. during this addition and analysis of the reaction mixture using proton nuclear magnetic resonance indicates that all of the double bond has disappeared. The reflux condenser and addition funnel are replaced with a nitrogen sparge and a distillation apparatus. Using a steam bath, the reaction mixture is heated to 90°–95° C. for 24 hours. After this time, the reaction mixture is a very viscous, light yellow amorphous solid. Analysis of this reaction mixture indicates that all of the ester moieties have reacted thereby yielding a linear polyamidoamine having a weight average molecular weight (Mw) as determined by light scattering of 4000–8000.

B. Preparation of Branched Polyamidoamine

The aforementioned linear polyamidoamine is diluted with water to 65 percent solids. A 50 g portion of this solution is charged into a 250 ml three-neck round bottom flask equipped with stirrer and reflux condenser and 24.54 g (stoichiometric amount with respect to amino hydrogens of the linear polyamidoamine) of methyl acrylate is added at one time. The temperature of the reaction mixture increases from ambient to 35° C. and is then heated with stirring at 80° C. for four hours. Analysis of the reaction mixture at this point indicates approximately 95 percent of the methyl acrylate has been added to the polymer to provide a linear polyamidoamine having carboxylate ester branches. To this material is added approximately 70 g of ethylenediamine (4 moles of ethylenediamine per mole of ester) and the heating of the reaction mixture is continued for an additional four hours. Analysis of this mixture using proton NMR indicates complete conversion of the ester moieties to amide moieties. Excess ethylenediamine, methanol and water are removed using a water aspirator vacuum at 60°–95° C.

C. Quaternization of Branched Polyamidoamine

Into a 100 ml, three-neck round bottom flask equipped with an air driven stirrer and thermometer is charged 16.79 g of a 57 percent solution of the aforementioned branched polyamidoamine. The flask is cooled to 5° C. and 7.73 g of epichlorohydrin (epi) (1:1 mole ratio of pendant amine hydrogen to epi) is added with stirring to the flask. The reaction mixture is allowed to warm to room temperature over a 7½-hour period and 41.81 g of water heated to 70° C. is added. The resulting stirred mixture is heated at 65° C. for one hour to yield a clear solution and then allowed to cool to room temperature. A quaternized 100 percent branched polyamidoamine (Wet Strength Additive A) is recovered.

For the purposes of comparison, the foregoing quaternization reaction is repeated using 5.42 g of epichlorohydrin and 10.28 g of a 65 percent aqueous solution of a 50 percent branched polyamidoamine. The 50 percent branched polyamidoamine is produced according to the procedure described hereinbefore except that only 12.27 g (0.5 mole of methyl acrylate per 1 mole of amino hydrogen) is employed. The resulting quaternized 50 percent branched polyamidoamine is Wet Strength Additive B in Table I.

Also for comparison, the above quaternization reaction is repeated using 24.2 g of an aqueous solution containing 57 percent of a linear (non-branched) polyamidoamine produced by the foregoing procedure and 11.19 g of epichlorohydrin to produce a quaternized linear polyamidoamine (Wet Strength Additive C). Also for purposes of comparison, 10.61 g of a 65 percent solid solution of a 100 percent branched polyamidoamine made by the foregoing procedure and 5.60 g of epichlorohydrin (1:1 mole ratio of amine hydrogens to epichlorohydrin) to yield a polymer (Wet Strength Additive D) containing quaternary moieties represented by the following formula:

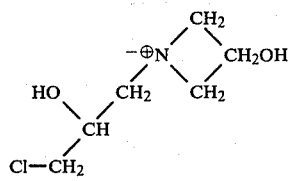

To 22.18 g of a 20 percent solution of this polymer in water is added 0.59 g of an aqueous solution of 50 percent sodium hydroxide and then maintained at room temperature for 6 days. Analysis of the resulting product indicates formation of a (Wet Strength Additive E) polymer having quaternary moieties represented by the following formula:

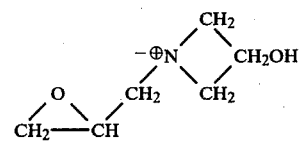

D. Treated Handsheet Preparation

A 1 percent slurry of bleached hard wood/soft wood Kraft (50/50) pulp is prepared in deionized water, and the pH of the resulting slurry is adjusted to 7. An aqueous solution containing 1 percent of a quaternized polyamidoamine as described hereinbefore is added to a 1 liter sample of the pulp slurry (5 cc of the 1 percent solution of polymer equal 10 pounds/ton of pulp). The slurry sample is mixed for 1 minute and then added to 7.5 liters of deionized water. The resulting pulp slurry is mixed in the proportionater section of a Noble and Wood apparatus. A 2 liter sample is then taken from the proportionater and added to 10 liters of deionized water in the headbox section. Three handsheets (2.5 g) are made from the slurry sample using a Noble and Wood handsheet mold (20 cm×20 cm). The handsheets are dried on a Noble and Wood drier at 208° F. to give an average of 4 to 4.5 percent moisture content in the sheets. One-half of the sheets are cured at 85° C. for 30 minutes in an oven. All of the sheets are soaked for at least one-half hour in deionized water, blotted dry and tested on a Mullins Burst tester. The results are reported as burst values in Table I. For the purpose of comparison, a control slurry is prepared which contains no polymeric additive formed into handsheets and tested for wet strength by the foregoing procedure. The results of this test are also recorded in Table I.

TABLE I

| Sample No. | Polymeric Wet Strength Additive (1) | | | Wet Burst, (2) lb/in$^2$ (kg/cm$^2$) | |
|---|---|---|---|---|---|
| | Type | Degree of Branching, mole % | Amount, lb/ton (kg/metric ton) | Uncured | Cured |
| C* | None | — | | 2.5 | 2.7 |
| 1 | A | 100 | 15 | 13.5 | 10.0 |
| 2 | B | 50 | 15 | 5.8 | 2.9 |
| A* | C | 0 | 15 | 4.0 | 3.0 |
| 3 | D | 100 | 10 | 11.3 | 7.7 |
| 4 | E | 100 | 10 | 14.9 | 11.8 |

*Not an example of the invention.
(1) A–E as defined before in this Example. Amount in pounds of the named polymeric wet strength additive per ton of pulp.
(2) Test procedure of TAPPI T-403 ts-65 and values calculated according to TAPPI T-220 m-60.

As evidenced by the data of Table I, ammonium derivatives of branched polyamidoamines are better wet strength additives than ammonium derivatives of linear polyamidoamines.

What is claimed is:

1. A method for improving the wet strength of paper which comprises contacting the paper pulp with an amount of water-soluble polyamidoamine bearing a pendant ammonium moiety having cross-linking functionality which is effective to increase the wet strength of the paper sheet formed from said pulp, (2) forming the pulp into an article of desired shape and (3) subjecting the article to conditions sufficient to cross-link the polyamidoamine.

2. The method of claim 1 wherein the pendant ammonium moiety is represented by the formula:

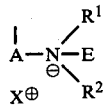

wherein each $R^1$ and each $R^2$ are independently hydrogen, halohydroxyhydrocarbyl, hydrocarbyl, hydroxyhydrocarbyl or aminohydrocarbyl, wherein amino is a secondary or tertiary amino; E is a monovalent hydrocarbon radical bearing an epoxy group or a group or groups capable of being converted to an epoxy group or E and $R^1$ are collectively a propylene radical or substituted propylene radical wherein the α-carbon substituents are $C_1$-$C_3$ alkyl and the β-carbon substituent is hydroxy, halo, hydrocarbyl or hydroxyhydrocarbyl; A is a divalent organic radical; X is a monovalent or polyvalent anion common to conventional ammonium salts.

3. The method of claim 2 wherein the polyamidoamine contains a quaternary ammonium repeating unit represented by the formula:

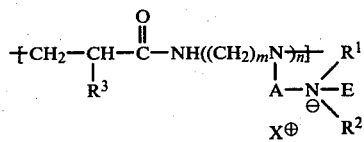

wherein each $R^1$ and each $R^2$ are independently hydrocarbyl, hydroxyhydrocarbyl or aminohydrocarbyl wherein the amino is a secondary or tertiary amino; E is a monovalent hydrocarbon radical bearing an epoxy group or a group or groups capable of being converted to an epoxy group or E and $R^1$ are collectively a propylene radical or substituted propylene radical wherein the α-carbon substituents are $C_1$-$C_3$ alkyl and the β-carbon substituent is hydroxy, halo, hydrocarbyl or hydroxyhydrocarbyl; A is a divalent organic radical, X is a monovalent or polyvalent anion common to conventional ammonium salts; each $R^3$ is independently hydrogen or lower alkyl, each m is a whole number from 2 to 6; and n is a whole number from 1 to 3.

4. The method of claim 3 wherein $R^3$ is hydrogen and $R^2$ is 3-chloro-2-hydroxypropyl or 2,3-epoxypropyl.

5. The method of claim 2 wherein the polyamidoamine is a random polymer represented by the statistical formula:

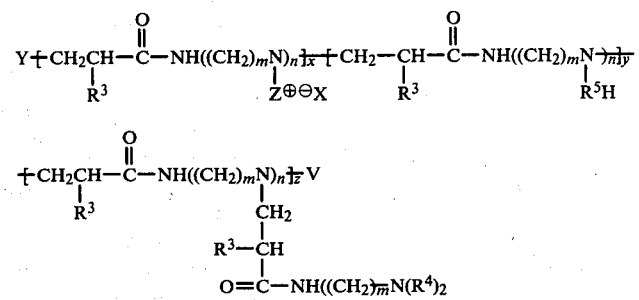

wherein Z is the ammonium moiety; each $R^3$ is independently hydrogen or methyl; each $R^4$ is independently hydrogen or lower alkyl; each $R^5$ is independently hydrogen or

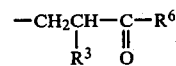

wherein $R^6$ is $NH_2$, OH or $OR^7$ wherein $R^7$ is hydrocarbyl; Y is a terminal group characteristic of a polyamidoamine; V is hydrogen or the residue of polymerization to form a polyamidoamine; each m is a whole number from 2 to 6; n is 1 or 2; x is a whole number from 1 to 1000; y is 0 or a whole number from 1 to 200; and z is 0 or a whole number from 1 to 200, provided that the ratio of x to (y+z) is at least 3:1.

6. The method of claim 2 wherein the pendant ammonium moiety is represented by the formula:

$$-CH_2CH-\underset{R^3}{\overset{O}{\overset{\|}{C}}}-NH{+}{+}CH_2{\underset{\overline{m}}{)}}NH{\underset{\overline{q}}{)}}{+}CH_2{\underset{\overline{m}}{)}}\underset{X^\oplus}{\overset{\diagup OH}{\underset{R^2}{\overset{\diagdown}{N}}}}$$

wherein $R^3$ is hydrogen or methyl; m is 2; q is 0, 1, 2 or 3; X is chloride and $R^2$ is alkyl, halohydroxyalkyl or epoxy.

* * * * *

UNITED STATES PATENT AND TRADEMARK OFFICE
CERTIFICATE OF CORRECTION

PATENT NO. : 4,416,729            Page 1 of 2

DATED : November 22, 1983

INVENTOR(S) : George R. Killat and Larry R. Wilson

It is certified that error appears in the above—identified patent and that said Letters Patent is hereby corrected as shown below:

Column 2, line 15, "$A-\overset{\underset{X^{\ominus}}{|}}{N}\overset{\overset{R^1}{\diagup}}{\underset{\diagdown R^2}{\oplus}}-E$" should read -- $A-\overset{\underset{}{|}}{N}\overset{\overset{R^1}{\diagup}}{\underset{X^{\ominus}\diagdown R^2}{\oplus}}-E$ --;

Column 2, line 47, that portion of the formula reading "$A-\overset{\underset{X^{\ominus}}{|}}{N}\overset{\overset{R^1}{\diagup}}{\underset{\diagdown R^2}{\oplus}}-E$"

should read -- $A-\overset{\underset{}{|}}{N}\overset{\overset{R^1}{\diagup}}{\underset{X^{\ominus}\diagdown R^2}{\oplus}}-E$ --.

Column 3, line 11, that portion of the formula reading "$\underset{X^{\ominus}}{N}\overset{}{\underset{\diagdown R^2}{\oplus}}$"

should read -- $\underset{}{N}\overset{}{\underset{X^{\ominus}\diagdown R^2}{\oplus}}$ --.

Column 11, line 5 "$A-\overset{\underset{X^{\oplus}}{|}}{N}\overset{\overset{R^1}{\diagup}}{\underset{\diagdown R^2}{\ominus}}-E$" should read -- $A-\overset{\underset{}{|}}{N}\overset{\overset{R^1}{\diagup}}{\underset{X^{\ominus}\diagdown R^2}{\oplus}}-E$ --.

UNITED STATES PATENT AND TRADEMARK OFFICE
CERTIFICATE OF CORRECTION

PATENT NO. : 4,416,729
DATED : November 22, 1983
INVENTOR(S) : George R. Killat and Larry R. Wilson It is certified that error appears in the above—identified patent and that said Letters Patent is hereby corrected as shown below:

Column 11, line 40, that portion of the formula reading " $\underset{X^{\ominus}}{A-\overset{R^1}{\underset{|}{N}}\overset{\oplus}{\diagdown}R^2}-E$ "

should read -- $\underset{X^{\ominus}}{A-\overset{R^1}{\underset{|}{N}}\overset{\oplus}{\diagdown}R^2}-E$ --.

Column 12, line 48, that portion of the formula reading " $\underset{X^{\ominus}}{N\overset{\oplus}{\diagdown}R^2}$ "

should read -- $\underset{X^{\ominus}}{N\overset{\oplus}{\diagdown}R^2}$ --.

Signed and Sealed this

Third Day of April 1984

[SEAL]

Attest:

GERALD J. MOSSINGHOFF

Attesting Officer    Commissioner of Patents and Trademarks